United States Patent
Haraguchi et al.

(10) Patent No.: US 6,264,708 B1
(45) Date of Patent: Jul. 24, 2001

(54) METHOD OF MANUFACTURING A PRISMATIC BATTERY

(75) Inventors: Kazunori Haraguchi, Osaka; Hiroshi Yoshizawa, Hirakata; Takuya Nakashima, Neyagawa; Takashi Takeuchi, Kadoma; Kikuo Senoo, Kobe, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/308,100

(22) PCT Filed: Sep. 28, 1998

(86) PCT No.: PCT/JP98/04353

§ 371 Date: May 17, 1999

§ 102(e) Date: May 17, 1999

(87) PCT Pub. No.: WO99/17385

PCT Pub. Date: Apr. 8, 1999

(30) Foreign Application Priority Data

Sep. 30, 1997 (JP) .................................................. 9-266092

(51) Int. Cl.$^7$ ................................................... H01M 6/00
(52) U.S. Cl. .................................... 29/623.2; 219/121.64; 429/185
(58) Field of Search .................................. 156/69, 272.8; 219/121.63, 121.64; 29/623.1, 623.2; 429/163, 171, 175, 185

(56) References Cited

U.S. PATENT DOCUMENTS 5,879,416  *  3/1999  Nakamura ........................... 29/623.2

FOREIGN PATENT DOCUMENTS

| 52-8958 | 1/1977 | (JP) . |
|---|---|---|
| 57-145265 | 9/1982 | (JP) . |
| 58-10364 | 1/1983 | (JP) . |
| 60-213388 | 10/1985 | (JP) . |
| 3-93148 | 4/1991 | (JP) . |
| 4-118191 | 4/1992 | (JP) . |
| 4-182092 | 6/1992 | (JP) . |
| 5-293682 | 11/1993 | (JP) . |
| 8-315788 | 11/1996 | (JP) . |
| 8-315789 | 11/1996 | (JP) . |
| 8-315790 | 11/1996 | (JP) . |

* cited by examiner

Primary Examiner—Michael W. Ball
Assistant Examiner—Michael A. Tolin
(74) Attorney, Agent, or Firm—Jordan and Hamburg LLP (57) ABSTRACT

Method of manufacturing a prismatic battery wherein a sealing plate (2) is abutted to an upper open end of a prismatic case (1) in which power generating elements are housed, and laser beams (3a–3d) are moved along an abutment line (4) parallel to the straight line of each side (a, b, c, d), by which each side (a–d) of the abutment line (4) including each of the corners (e) is laser welded, thereby hermetically sealing the prismatic case (1).

8 Claims, 7 Drawing Sheets

METHOD OF MANUFACTURING A PRISMATIC BATTERY

BACKGROUND

The present invention relates to a method of manufacturing prismatic batteries, and more particularly to an improved method for hermetically sealing a prismatic case housing power generating elements by welding a sealing plate on the open end of the prismatic case.

By way of example, secondary batteries used as power sources for portable electronic instruments are required to be of a high energy density and, at the same time, are required to be of a shape efficient in terms of space used in order to achieve weight-lightness and compactness. A lithium ion secondary battery which uses a prismatic aluminum casing is a battery which fulfills these requirements.

Because the lithium ion secondary battery, in terms of its structure apart from anything else, is required to be hermetically stable over a long time, a sealing plate is bonded by laser welding to the open end of a prismatic case formed as a square tube shape with a bottom, thereby sealing its open end. Such a laser welding method has a characteristic of excellent operation efficiency as compared with other welding methods, since it causes less thermal effect on the electrolyte and electrically insulated portions housed within the casing.

Conventional methods for manufacturing prismatic batteries by laser welding of the prismatic case and sealing plate include those disclosed in Japanese Patent Laid-open No. 8-315788, Japanese Patent Laid-open No. 8-315789, and Japanese Patent Laid-open No. 8-315790. In these disclosed manufacturing methods, the sealing plate is fitted into the open end of a prismatic case, which is positioned with the open end facing upwards. The laser beam is irradiated from a vertical direction toward the abutment area of the prismatic case and sealing plate; and this abutment area is scanned with the laser beam and welded, whereby the open end of the prismatic case is hermetically sealed with the sealing plate.

However, in order to weld the abutment area between the sealing plate and the prismatic case which is disposed upright with its open end facing upwards with the laser beam that is irradiated from the vertical direction, it is necessary to move either the laser beam or the prismatic case along the welding line formed of straight lines of four sides linked by each corner at the open end of the case, wherefore control of scanning the abutment line to be welded with the laser beam becomes complex, thus causing a problem of low production efficiency. Also, since weld penetration caused by welding occurs towards the inside of the battery as the abutment area is welded by the laser beam irradiated from the vertical direction, there is a risk of molten metal infiltrating the battery if the amount of penetration is increased. Moreover, the precision to which the prismatic case and sealing plate can be finished does have limits. Even if the amount of penetration during welding is optimized so as not to reach into the battery, penetration may reach into the battery due to variations in the finishing precision of the thin materials. In such a case, molten metal dropping into the battery may cause internal short circuits. Moreover, although laser welding is a welding method which does not have much thermal influence on the electrolytic solution and electrical insulating matter, since the heating is directed towards the battery interior, thermal effects are difficult to eliminate because of limits to welding precision or to the finishing precision of the prismatic case and sealing plate.

SUMMARY OF THE INVENTION

The present invention has been devised in view of the foregoing problems in the prior art. It is an object of the present invention to provide a method of manufacturing prismatic batteries with which control of scanning with a laser beam for performing laser welding can be simply made, and the prismatic case and sealing plate can be joined by a uniform weld and without thermal effects on the interior of the battery.

In order to accomplish above said object, the method of manufacturing a prismatic battery according to the present invention wherein power generating elements are housed in a prismatic case formed as a square tube shape with a bottom having a square opening configuration including four straight sides and curved corners of a prescribed radius, and a sealing plate is laser welded to the open end of the prismatic case, thereby sealing the open end of the prismatic case with the sealing plate. The sealing plate is abutted to the open end of the prismatic case; a laser beam is directed from a lateral direction of the prismatic case to an abutment line where the prismatic case and the sealing plate are abutted with each other; and the laser beam is moved linearly along a direction parallel to lines of the four sides, whereby the prismatic case and the sealing plate are laser welded together.

According to the above manufacturing method, the sealing plate is abutted onto the open end of the prismatic case to form at the upper end of the prismatic case, an abutment line where the sealing plate meets the open end of the prismatic case. By irradiating laser beams to this abutment line from a lateral side of the prismatic case and by scanning it along parallel to the four sides, the sealing plate is welded to the open end of the prismatic case. In this welding method, since the scanning with the laser beam is made along a straight line, the control thereof is simple.

In the above manufacturing method, by scanning each of the abutment lines at the same time with four laser beams respectively provided corresponding to each of the four sides in the directions parallel to the lines of each side, welding of all four sides is simultaneously performed. Operation efficiency is thus improved, and slippage of the sealing plate due to the welding operation does not occur.

Also, by scanning and welding each of the abutment lines successively with a pair of or a single laser beam, in parallel to lines of the four sides, a given pair of opposing abutment lines is welded at the same time, whereby slippage of the sealing plate caused by the welding operation is prevented and welding is performed efficiently. Also, if the sealing plate is securely held in position on the prismatic case, welding can be sequentially performed starting from any given one of sides by scanning with the laser beam in parallel to this side.

Furthermore, by controlling the scanning with the laser beam such as to change the laser output in accordance with a curving radius of the corners when the laser beam is moved between straight lines of each side and the corners, unevenness of the welding strength because of the difference in the focal distance of the laser beam between the straight sides and the curved 5 corners is compensated for by the variation of laser output, whereby decrease in the welding strength at the corners can be prevented.

Scanning with the laser beam may also be controlled such as to change the pulse separation of the laser beam in accordance with a curving radius of the corners when the laser beam is moved between straight lines of each side and the corners. An irradiation amount of laser beam per unit time is equalized in the straight sides and curved corners by varying the pulse separation of laser beam, whereby unevenness in the welding strength caused by difference in the focal distance of laser beam will be eliminated and decrease in the welding strength at the corners can be prevented.

Furthermore, by giving an inclination to the irradiation angle of the laser beam at a prescribed angle with respect to the direction of scanning line, the incident angle of the laser beam in relation to the corners does not become acute, whereby the decrease in welding strength at the corners can be reduced. Also, damages of the laser irradiation source caused by the reflected light of the irradiated laser beam can be eliminated.

Furthermore, prismatic cases respectively having the sealing plates placed on the open end thereof may be arranged in a row, and laser beams irradiated from a direction orthogonal to the direction of alignment of the cases and moved in parallel to each straight line of opposing sides parallel to the direction of alignment of the cases, thereby scanning and welding the abutment line between each prismatic case and each sealing plate. Prismatic cases with respective sealing plates thereon are thus successively laser welded by the laser beams moved in the direction of alignment of the cases. Welding is collectively performed to the plurality of prismatic cases by moving the laser beam relative to the prismatic cases aligned in a row, thereby enhancing production efficiency in a mass-production process.

Furthermore, when machining, prismatic cases and sealing plates are finished such that burrs of the prismatic cases created at the abutment line are directed towards the interior of battery and those of the sealing plates are directed towards the prismatic case. There will be no burrs projecting at positions to which laser beams are irradiated, or conversely, there will be no indentations which damage flatness of the case. Thus, weld appearance will not be damaged by the spattering of molten projections and welding failure caused by the damaged flatness will not occur, and the sealing plate can be welded to the prismatic case accurately.

Also, by welding such that the relationship between the welding nugget diameter d melted by the laser beam and the radius R at the corners is $0.3<(d/R)$, the occurrence of cracks caused by laser welding can be reduced.

DETAILED DESCRIPTION OF THE INVENTION

Preferred embodiments of the present invention will be hereinafter described with reference to the accompanying drawings for the understanding of the present invention.

Figure 1:
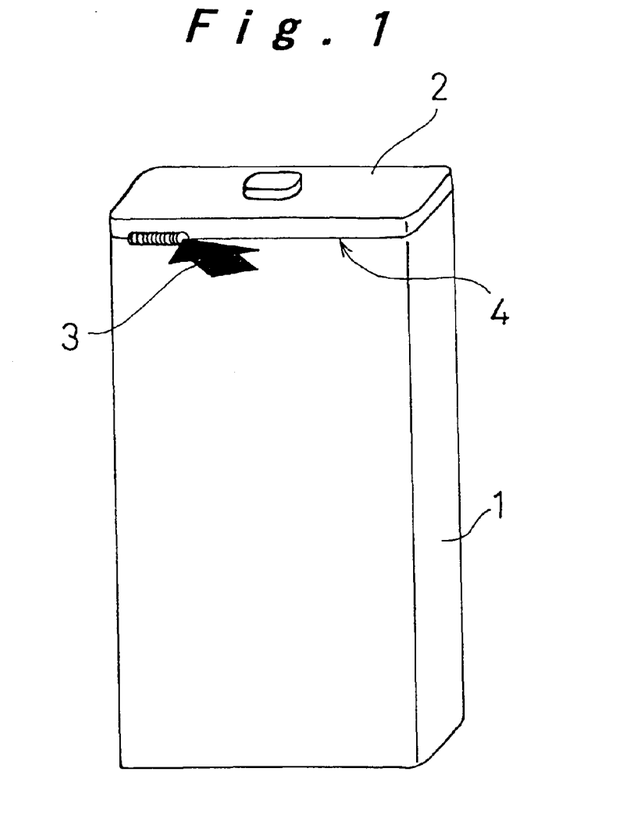
FIG. 1 is a perspective view of a prismatic battery according to one embodiment of the present invention.
Figure 2:
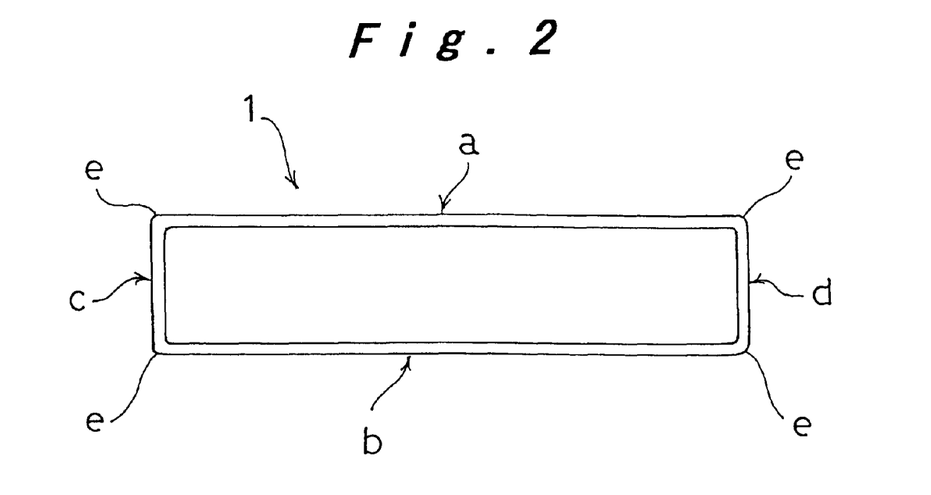
FIG. 2 is a plan view of the open end of a prismatic case.

FIG. 1 shows the outer appearance of a prismatic battery according to one embodiment of the present invention. The prismatic battery is manufactured by welding a sealing plate 2 onto the open end of a prismatic case 1 housing power generating elements and sealing the prismatic case 1. The prismatic case 1 is formed as a rectangle tube shape with a bottom such that its planar configuration at the open end thereof appears as shown in FIG. 2, wherein the longer sides a, b and the shorter sides c, d are straight lines while each of the corners e is curved with a prescribed radius.

The sealing plate 2 is formed with external dimensions equal to those of the open end of this prismatic case 1. The sealing plate 2 is mounted on the open end of the prismatic case 1 and the open end of the prismatic case 1 is sealed with the sealing plate 2 by the laser welding of the abutment line where each of the straight sides a–d is joined by the curve of each corner e. The method for welding the sealing plate 2 to the open end of the prismatic case 1 is explained below.

FIG. 3(a) shows a state, as seen from above, where the prismatic case 1 is in a prescribed position such that the tube forming axis of each tube is oriented in a vertical direction, with the open end facing upwards and the sealing plate 2 placed over the open end. Laser beams 3a–3d are moved parallel to lines of longer sides a, b and shorter sides c, d, whereby the abutment line where the prismatic case 1 meets the sealing plate 2 is laser welded as shown in FIG. 3(b), thus sealing the open end of the prismatic case 1 with the sealing plate 2. In this way, the scanning direction of each of the laser beams 3a–3d is collinear with each of the straight sides a–d. Control of the movement is therefore easy and a precise welding action can be carried out.

Figure 3:
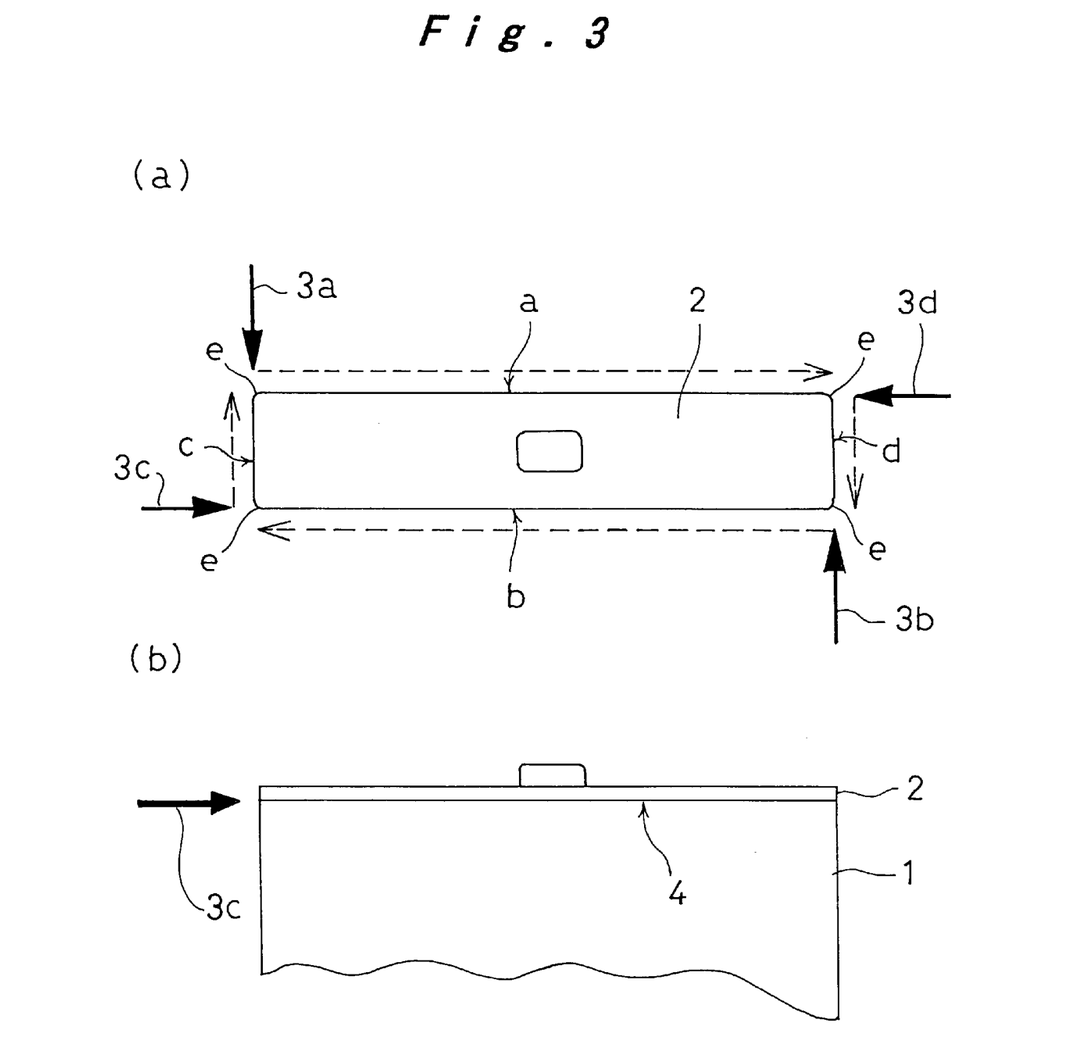
FIG. 3(a) is a plan view showing the scanning direction of a laser beam in relation to the abutment line.
FIG. 3(b) is a side view showing the incident angle of the laser beam in relation to the abutment line.
Figure 4:
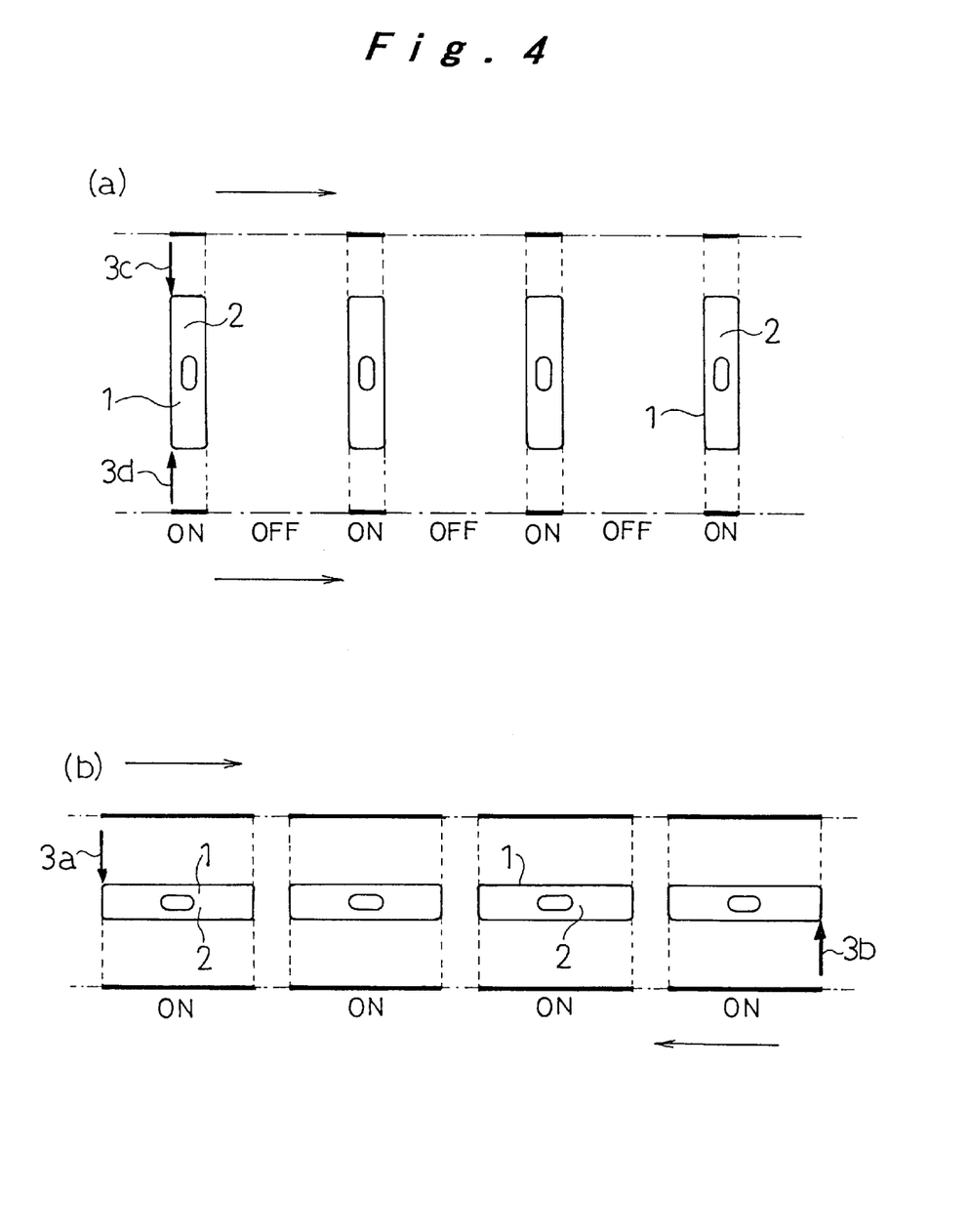
FIG. 4 is a plan view showing an example of a laser welding process executing the welding of a plurality of prismatic batteries at the same time, where (a) shows the welding of shorter sides, and (b) shows the welding of longer sides.

If the steps of laser welding are such that, as shown in FIG. 3, four laser beams 3a, 3b, 3c, 3d are moved along straight lines parallel to the longer sides a, b and shorter sides c, d, the welding actions to each of the sides a, b, c, d including each of the corners e are performed simultaneously. Thus, welding can be carried out efficiently and without slippage of the sealing plate 2, even when the mounted sealing plate 2 is not temporarily tacked onto the prismatic case 1. Also, in a mass-production process, as shown in FIG. 4(a), prismatic cases 1 to which respective sealing plates 2 are abutted are arranged in a row, and the laser beams 3c, 3d are moved in relation to the prismatic cases in the direction of alignment of prismatic cases while being switched on and off, so that the shorter sides c, d including each of the corners e are simultaneously welded, and successively, as shown in FIG. 4(b), the direction of alignment of the prismatic cases is changed, and the remaining longer sides a, b including each of the corners e are laser welded. At this time, the laser beams 3a, 3b may be irradiated to the longer sides a, b at the same time, but, in order for the heat generated by laser welding not to be concentrated, direction or position of scanning with the laser beams 3a, 3b is preferably changed so as to weld the longer side a or the side b one at a time, so that thermal effects on the battery can be suppressed. Also, if the sealing plate 2 is temporarily tacked onto the prismatic case 1 to prevent slippage, welding can be sequentially performed starting from one side including a given one of corners e.

Figure 5:
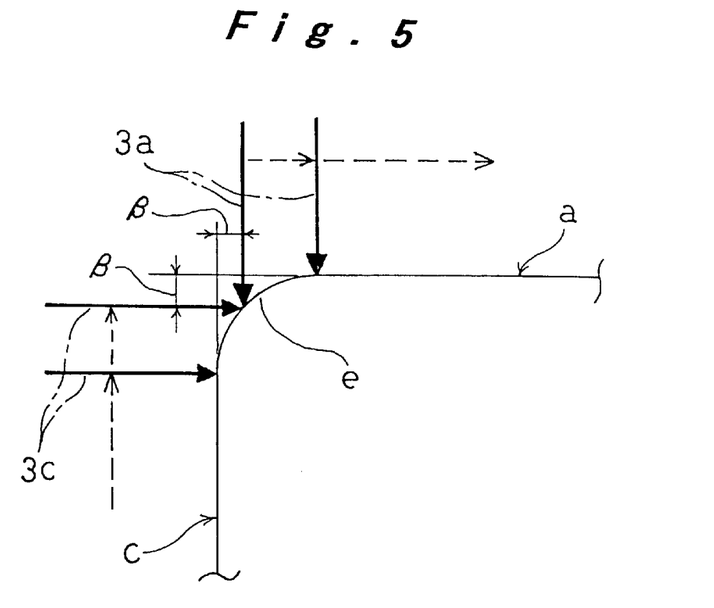
FIG. 5 is a diagram to explain the occurrence of difference in focal distance of laser beam at the corners.
Figure 6:
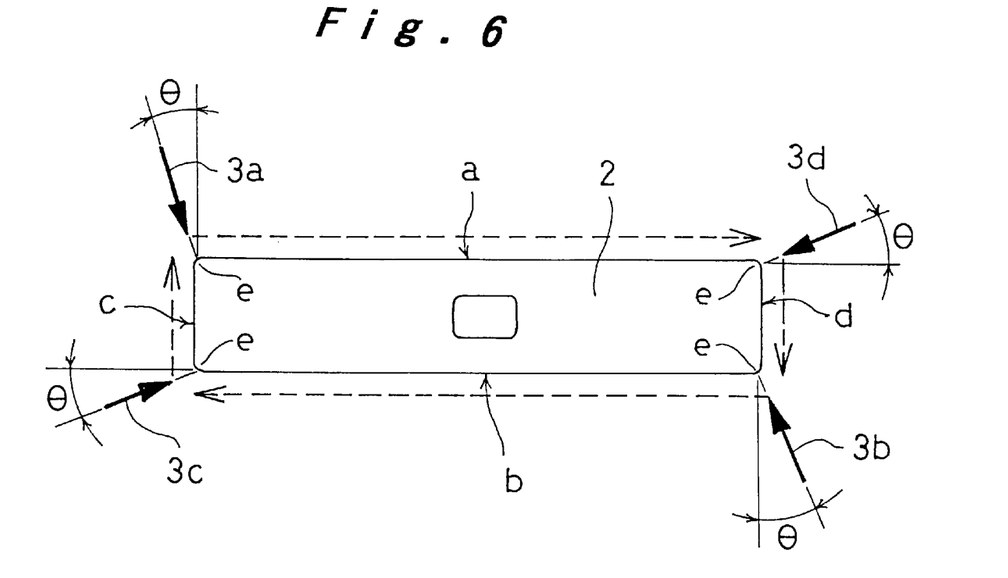
FIG. 6 is a plan view showing a scanning method with the laser beam of which incident angle in the horizontal direction is inclined.

When moving laser beams 3 parallel to each side a, b, c, d as set forth above, the focal points of the laser beams 3 become more distant at each corner e formed by a curve, as a result of which the capacity of laser welding at the corners e is decreased. In other words, as shown in FIG. 5, with respect to the laser beam 3a, there will be a maximum distance differential β between the focal point of the laser beam 3a at the scanning start position on the curve of the corner e and that at the position for scanning the long side a. Similarly, at the scanning end position, i.e., with respect to the laser beam 3c as shown in FIG. 5, there will be a maximum distance differential β between the focal point of the laser beam 3c at the scanning end position and that at the position for scanning the short side c. The decrease in weld strength for the corners e due to this distance differential β is resolved with the welding methods shown below.

A first method is to vary laser output at the points where the laser beams 3a–3d scan the corners e corresponding to the distance differential with respect to each of the sides a–d. In other words, the increase in laser output can compensate for the decreased welding capacity at the corners e where the focal point becomes distant, and a uniform weld can therefore be made along the entire abutment line 4.

A second method is to vary the laser pulse irradiation intervals at the points where the laser beams 3a–3d scan the corners e corresponding to the distance differential with respect to each of the sides a–d. In other words, the laser pulse irradiation intervals are decreased as the distance differential increases, so that the laser pulse irradiation intervals are caused to become shorter in the direction in which the distance differential increases. By varying the laser pulse irradiation intervals in this way, the distance differential is compensated for by the amount of irradiation per unit time of the laser beams 3. Thus, a uniform weld can be made along the entire abutment line 4.

Figure 8:
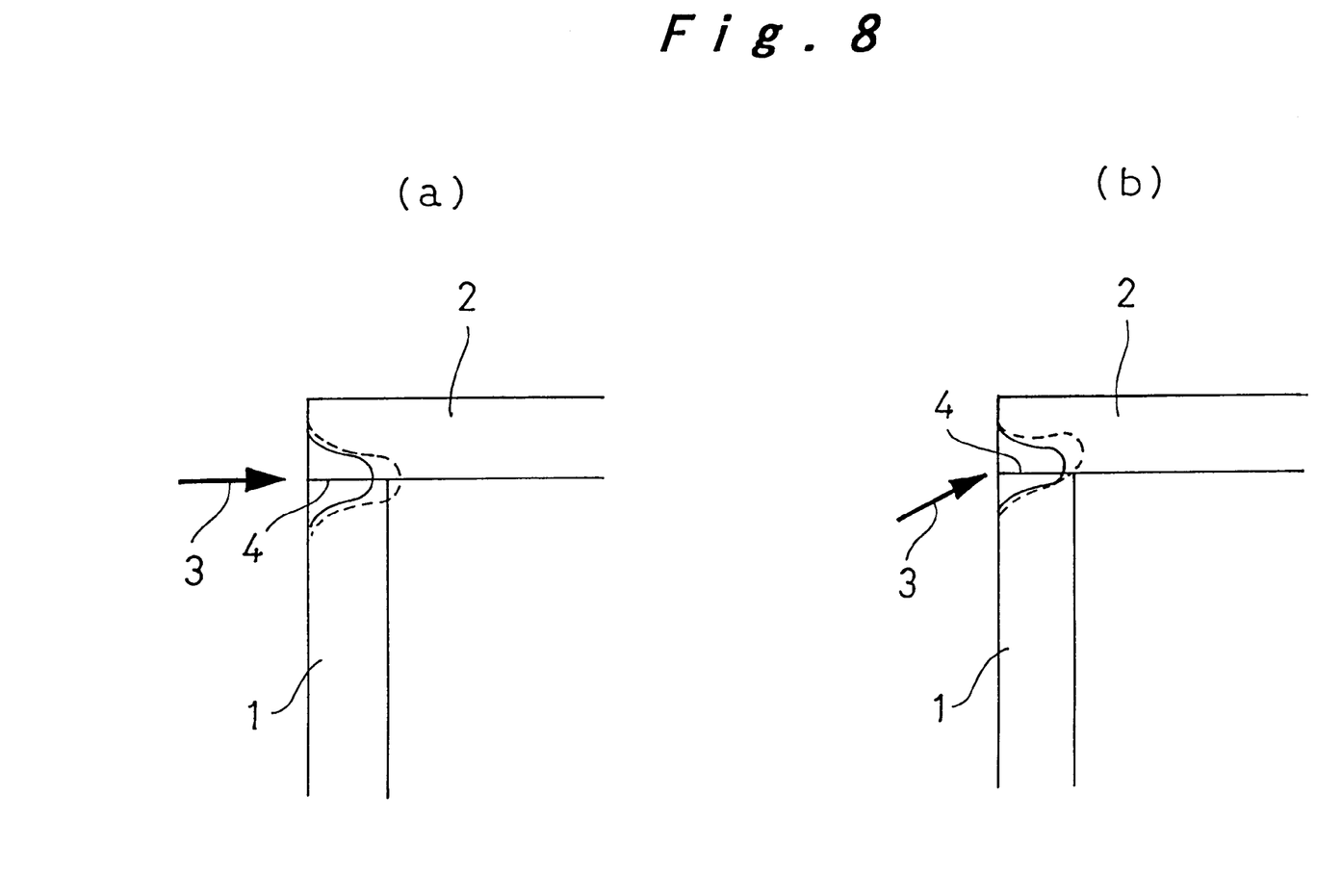
FIGS. 8a and 8b are diagrams to explain the effects of inclining the incident direction relative to the vertical direction.

In the laser welding of the abutment line 4 described above, irradiation angle of each of the laser beams 3a–3d in the horizontal direction may be inclined at an angle θ from the directions perpendicular to each of the sides a, b, c, d as shown in FIG. 8. As a result, the laser beams 3a–3d are less reflected and welding can be performed without a decrease in welding strength, since the angle of incidence of the laser beams 3 in relation to the corners e is increased. Also, the light reflected when the laser beams 3 are directed towards the abutment line 4 does not return to the sources of the laser beams, whereby damage to the sources of the laser beams due to reflected light is prevented. Furthermore, uniform welding strength can be achieved by giving an inclination to the irradiation angle of the laser beams 3a–3d, thereby obviating the necessity for compensating for decrease in the welding strength at the corners e by the method of varying the laser output or the like.

When welding each of the corners e, it is preferable to adjust the spot diameter or the output of the laser beam 3 such that the relationship between the radius R of the corners e and the diameter d of a molten bead or a nugget which is formed by the irradiation of the laser beam 3 is 0.3<(d/R), by which the occurrence of cracks caused by laser welding can be suppressed.

Figure 7:
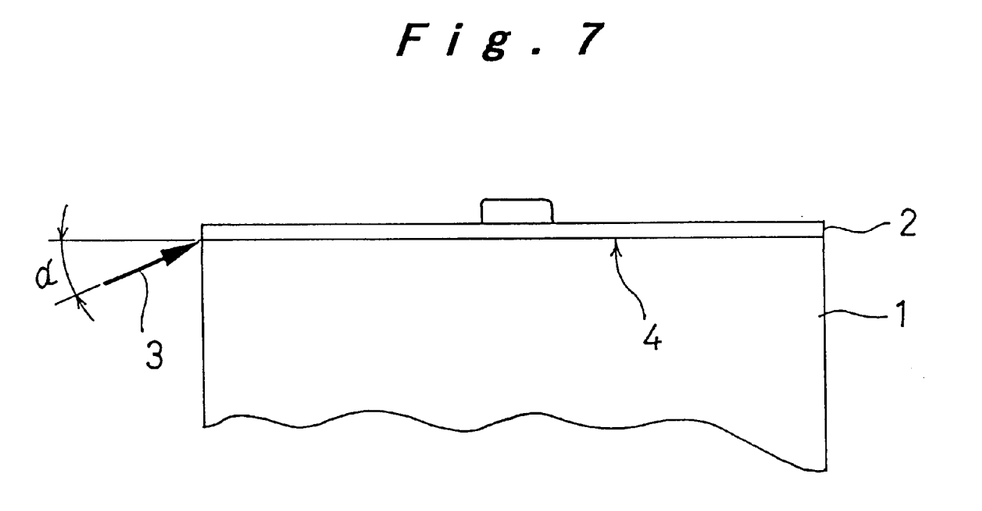
FIG. 7 is a side view showing a scanning method with the laser beam of which incident angle in the vertical direction is inclined.

Further, as shown in FIG. 7, by directing the laser beams 3a–3d upwards at an angle a from the horizontal direction to the abutment line 4, thermal effects of laser welding are prevented from reaching into the battery. According to the laser welding in this embodiment, since welding is performed from a lateral side with respect to the upper end of the prismatic case 1 housing the power generating elements, thermal effects of laser welding will hardly reach the interior of the battery. Even in the case where penetration reaches the interior of the battery caused by irregularities in the material thickness of the prismatic case, such inclination of the laser irradiation angle in this embodiment is effective.

Since the prismatic case 1 and sealing plate 2 are formed of thin aluminum sheets in order for the battery to be thin and light, these must be welded precisely. However, there are limits to the precision to which these can be finished. In particular, since the prismatic case 1 is drawn into a tubular shape having a bottom, variations in thickness occur easily.

As a result, even if the amount of penetration of the abutment line 4 by the laser beams 3a–3d is predetermined to be uniform, penetration may still reach into the battery because of the variations in thickness. FIG. 8 shows in cross sections the state of the abutment line 4 when subjected to laser welding. When the laser beam 3 is directed from a direction horizontal to the abutment line 4 as shown in FIG. 8(a), penetration can reach into the battery as shown by the dotted lines due to variations in thickness as explained above. Since the power generating elements are housed within the battery, when penetration reaches into the battery, spatter from the melting of the prismatic case 1 and sealing plate 2 can get into the battery and may result in the battery being defective because of internal short circuits. Thus, the direction of the laser beam 3 is inclined at an upward angle to the abutment line 4 as shown in FIG. 8(b). In this way, since the penetration advances towards the sealing plate 2, even deep penetration does not reach into the battery as shown by the dotted lines and spatter due to variations in thickness is prevented from getting into the battery.

Figure 9:
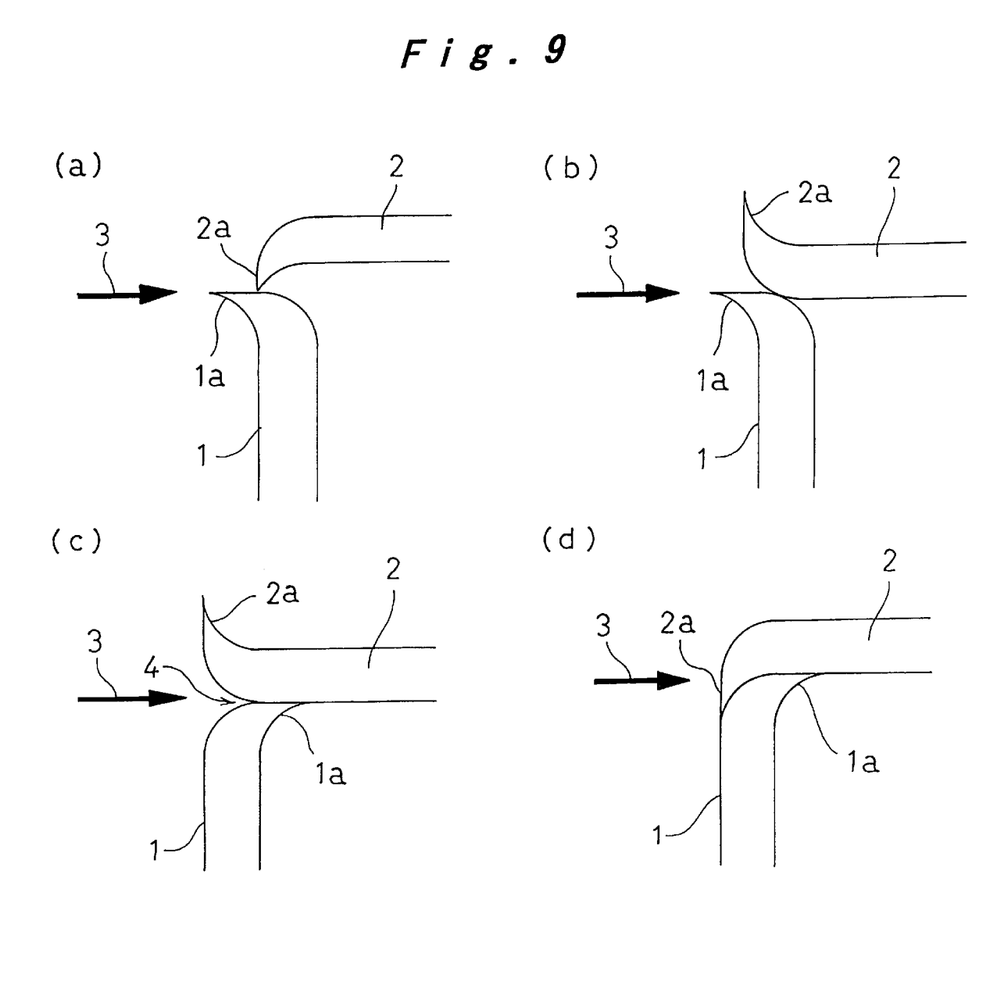
FIG. 9 is a model view showing in cross sections the states (a)–(c) where the direction of burrs on the prismatic case and sealing plate is inappropriate and the state (d) where the direction of burrs is appropriate.

The occurrence of burrs in the cutting process during manufacture of the prismatic case 1 and sealing plate 2 is inevitable. FIG. 9 is a model view showing a burr 1a created on the prismatic case 1 and a burr 2a formed on the sealing plate 2a in an exaggerated manner. Since the burrs 1a, 2a are formed in a manner projecting toward a cutting direction, if the burr 1a on the prismatic case 1 is protruded outwardly along the abutment line which is to be welded as shown in FIGS. 9(a) and (b), the burr 1a will be melted by the irradiated laser beam 3 and spatter, which damages the appearance of the weld.

Also, as shown in FIG. 9(a), in case the burr 1a on the prismatic case 1 is formed outwardly and the burr 2a on the sealing plate 2 is projected toward the abutment side where the sealing plate 2 meets the prismatic case 1, the sealing plate 2 cannot be tightly contacted with the prismatic case 1 because of the protruded burr 2a, and if laser welding is performed in this state, not only will the spattering occur but also the gap in the abutment line will cause welding failure. Further, as shown in FIG. 9(c), if the burr 1a on the prismatic case 1 is formed inwardly and the burr 2a on the sealing plate 2 is created upwardly, there will be a dent along the abutment line 4, damaging the flatness and causing welding failure.

Accordingly, as shown in FIG. 9(d), the cutting direction of the prismatic case 1 and sealing plate 2 is determined such that the burr 1a on the prismatic case 1 will protrude inwardly whereas the burr 2a on the sealing plate 2 will be directed downwards, so that, when the sealing plate 2 is placed on the prismatic case 1, the inward indent of the burr 1a on the prismatic case 1 will be covered by the downward burr 2a on the sealing plate 2, and there will be no projections or dents in the welding area, by which welding failure caused by burrs 1a, 2a is prevented.

INDUSTRIAL APPLICABILITY

As set forth above, according to the welding method of the present invention, since the open end of the prismatic case is welded by a linear operation in parallel to each of the sides thereof, the control of welding operation is simple. It is controlled such that the welding strength will be the same as that of the linear parts even in the welding line including curves, and, by restricting the direction of burrs formed on the abutment line, it is ensured that the open end of the prismatic case is hermetically sealed with the sealing plate with uniform welding strength. Therefore, owing to its ability to enhance production efficiency and to cause less thermal effects on the battery innards, the present invention is useful as a technical measure for responding to the needs for enhancement of battery quality and for batteries that are hermetically stable over a long period of time.

What is claimed is:

1. A method of manufacturing a prismatic battery comprising:
   inserting power generating elements into a prismatic case formed as a rectangular tube having a bottom and a tube end surface defining a rectangular opening including four sides and curved corners of a prescribed radius;
   abutting a sealing plate to the tube end surface defining the rectangular opening of the prismatic case;
   directing at least one laser beam from a lateral direction of the prismatic case to an abutment line where the tube end surface of the prismatic case and the sealing plate are abutted to each other; and
   moving the at least one laser beam, relative to the prismatic case, linearly along a direction parallel to the sides such that the prismatic case and the sealing plate are laser welded together, wherein the at least one laser beam is inclined at a prescribed angle with respect to said sealing plate to provide a melt depth extending toward a center of a thickness of said sealing plate.

2. The method of manufacturing a prismatic battery according to claim 1, wherein said at least one laser beam includes four laser beams respectively directed to each of the sides and which are respectively moved in directions parallel to said sides such that the abutment line at each of the sides is simultaneously welded.

3. The method of manufacturing a prismatic battery according to claim 1, wherein:
   said at least one laser beam includes a pair of laser beams; and
   the abutment line at each of said sides is successively scanned and welded with the pair of laser beams which are moved in parallel to each of the four sides.

4. The method of manufacturing a prismatic battery according to claim 1, wherein scanning with the at least one laser beam is controlled such as to change laser output in accordance with a curving radius of the curved corners when the at least one laser beam is moved between each of the sides and the curved corners.

5. The method of manufacturing a prismatic battery according to claim 1, wherein scanning with the at least one laser beam is controlled such that pulse separation of the at least one laser beam is effected in accordance with a curving radius of the curved corners when the at least one laser beam is moved between each of the sides and the curved corners.

6. A method of manufacturing a prismatic battery comprising:
   inserting power generating elements into a plurality of prismatic cases, each formed as a rectangular tube having a bottom and a tube end surface defining a rectangular opening including four sides and curved corners of a prescribed radius;
   abutting a sealing plate to the tube end surface defining the rectangular opening of each of the prismatic cases;
   aligning the prismatic cases in a row;
   directing laser beams, from a lateral direction of the prismatic cases, respectively to abutment lines where each of the prismatic cases and each of the sealing plates are abutted with each other along said sides, respectively; and
   moving each of the laser beams, relative to the prismatic cases, linearly along a direction parallel to the sides of each of the prismatic cases, respectively, whereby each of the laser beams is irradiated from a direction orthogonal to the direction of alignment of each of the prismatic cases, respectively, so that the abutment lines at opposing ones of said sides which are parallel to the direction of alignment of the prismatic cases are scanned with the laser beams to effect welding of the abutment line of each of the prismatic cases and each of the sealing plates.

7. A method of manufacturing a prismatic battery comprising:
   inserting power generating elements into a prismatic case formed as a rectangular tube having a bottom and a tube end surface defining a rectangular opening including four sides and curved corners of a prescribed radius;
   abutting a sealing plate to the tube end surface defining the rectangular opening of the prismatic case;
   directing at least one laser beam from a lateral direction of the prismatic case to an abutment line where the tube end surface of the prismatic case and the sealing plate are abutted to each other; and
   moving the at least one laser beam, relative to the prismatic case, linearly along a direction parallel to the sides such that the prismatic case and the sealing plate are laser welded together, wherein directions of burrs at the abutment line are oriented such that one set of the burrs, on the prismatic case, is protruded toward an inside of the battery, and another set of the burrs, on the sealing plate, is projected toward the prismatic case.

8. A method of manufacturing a prismatic battery comprising:
   inserting power generating elements into a prismatic case formed as a rectangular tube having a bottom and a tube end surface defining a rectangular opening including four sides and curved corners of a prescribed radius;
   abutting a sealing plate to the tube end surface defining the rectangular opening of the prismatic case;
   directing at least one laser beam from a lateral direction of the prismatic case to an abutment line where the tube end surface of the prismatic case and the sealing plate are abutted to each other; and
   moving the at least one laser beam, relative to the prismatic case, linearly along a direction parallel to the sides such that the prismatic case and the sealing plate are laser welded together wherein welding is performed such that a relationship between a diameter d of a molten nugget created by the at least one laser beam and a radius R of the corners is $0.3 < (d/R)$.

* * * * *